United States Patent
Inagaki

(10) Patent No.: US 7,142,969 B2
(45) Date of Patent: Nov. 28, 2006

(54) BEHAVIOR CONTROL SYSTEM FOR VEHICLE

(75) Inventor: Shoji Inagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 289 days.

(21) Appl. No.: 10/713,111

(22) Filed: Nov. 17, 2003

(65) Prior Publication Data

US 2005/0075778 A1    Apr. 7, 2005

(30) Foreign Application Priority Data

Nov. 26, 2002    (JP)    ............... 2002-342092

(51) Int. Cl.
*G06F 7/70*    (2006.01)
(52) U.S. Cl. ............... 701/70; 701/72; 701/75; 701/89
(58) Field of Classification Search ............... 701/37, 701/70, 72, 74, 75, 76, 79, 80, 89
See application file for complete search history.

(56) References Cited

U.S. PATENT DOCUMENTS

| | | | | |
|---|---|---|---|---|
| 5,321,616 A | * | 6/1994 | Okuda et al. | 701/37 |
| 5,376,868 A | * | 12/1994 | Toyoda et al. | 318/587 |
| 5,924,510 A | * | 7/1999 | Itoh et al. | 180/197 |
| 6,269,307 B1 | * | 7/2001 | Shinmura et al. | 701/301 |
| 2002/0075139 A1 | * | 6/2002 | Yamamoto et al. | 340/436 |

FOREIGN PATENT DOCUMENTS

| | | |
|---|---|---|
| DE | 196 28 485 A1 | 1/1997 |
| EP | 1 215 103 A2 | 6/2002 |
| EP | 1 362 754 A1 | 11/2003 |
| JP | A 8-310366 | 11/1996 |
| JP | A 09-039762 | 2/1997 |
| JP | A 10-315941 | 12/1998 |
| JP | A 11-173176 | 6/1999 |
| KR | A 2001-0097095 | 11/2001 |
| WO | WO 02/083471 A1 | 10/2002 |

* cited by examiner

*Primary Examiner*—Gertrude A. Jeanglaude
(74) *Attorney, Agent, or Firm*—Oliff & Berridge, PLC

(57) ABSTRACT

In a vehicle behavior control system, a target braking force applied to each wheel of the vehicle is obtained based on a master cylinder pressure so as to be proportional to a vertical load of each wheel. When it is determined that a braking force is applied to the vehicle running on a road with uneven friction coefficient, an excess yaw moment caused by the difference between the target braking force and an actual braking force is calculated. A steering angle is corrected with a correcting steering angle estimated based on the excess yaw moment. A yaw rate difference is calculated as a difference between a normal yaw rate and an actual yaw rate of the vehicle based on the steering angle that has been corrected. It is determined whether the vehicle behavior is deteriorated based on the yaw rate difference. The vehicle behavior is then controlled to reduce the yaw rate difference.

20 Claims, 9 Drawing Sheets

BEHAVIOR CONTROL SYSTEM FOR VEHICLE

INCORPORATION BY REFERENCE

The disclosure of Japanese Patent Application No.2002-342092 filed on Nov. 26, 2002, including the specification, drawings and abstract are incorporated herein by reference in its entirety.

BACKGROUND OF THE INVENTION

1. Field of the Invention

The invention relates to a vehicle behavior control system, and particularly, a vehicle behavior control system that obtains a value that indicates a normal vehicle state (hereinafter referred to a normal vehicle state value) based on an operating amount of a vehicle operator with respect to a vehicle operating member so as to control the vehicle behavior based on an actual vehicle state value and the normal vehicle state value.

2. Description of Related Art

Conventionally the aforementioned behavior control system for vehicle, for example, an automobile is disclosed in Related Art No. 1 (JP-A-8-310366). In the publication, the normal vehicle state value is obtained based on an amount of steering performed by a vehicle operator, the behavior of the vehicle is estimated based on the normal vehicle state value and the actual vehicle state value. The target vehicle state value is further obtained based on the estimated vehicle behavior. Finally the vehicle behavior is controlled by controlling the braking device based on the obtained target vehicle state value.

In the aforementioned vehicle behavior control system, if the vehicle behavior is deteriorated, that is, it is brought into the condition of spin or drift out state, a target vehicle state value to stabilize the vehicle behavior is calculated based on such deteriorated behavior so as to regulate the braking device in accordance with the target vehicle state value. This makes it possible to stabilize the vehicle behavior by establishing the target vehicle state value.

Related Art No. 2 (JP-A-11-173176) discloses the vehicle attitude control system that adjusts an engine output in accordance with a degree of counter steering operation. Related Art No. 3 (JP-A-10-315941) discloses the vehicle behavior control system that appropriately controls the turning behavior of the vehicle in accordance with a steering operation of the vehicle operator by reducing the control response upon the counter steering.

In the case where the braking force is applied to the vehicle that is running on the road having a friction coefficient that varies depending on the right side of the road corresponding to the right wheels of the vehicle and the left side of the road corresponding to the left wheels of the vehicle, i.e., the road with uneven friction coefficient, the vehicle tends to be directed to the road side having higher friction coefficient owing to the difference in the applied braking force between the right wheels and the left wheels. Accordingly the vehicle operator tries to perform steering toward the direction such that the aforementioned deflection of the vehicle is corrected. The vehicle behavior control system as described above will reduce the braking force applied to the wheels corresponding to the road side with the higher friction coefficient to decrease the yaw moment resulting from the difference in the braking force between the right wheels and the left wheels for stabilizing the behavior of the vehicle in the aforementioned condition. The aforementioned efforts to stabilize the vehicle behavior and to secure the reliable braking force applied to the vehicle, thus, contradict with each other. It is preferable to execute the vehicle behavior control that requires an effort of the vehicle operator to correct the steering operation so as to stabilize the vehicle behavior during braking operation of the vehicle running on the road with uneven friction coefficient.

In the aforementioned vehicle behavior control system as disclosed in the above-identified publications, the normal vehicle state value is obtained based on the amount of steering performed by the vehicle operator without considering the correction of the steering performed by the vehicle operator. Then the vehicle behavior is estimated based on the obtained normal vehicle state value and the actual vehicle state value. The target vehicle state value is then obtained based on the estimated vehicle behavior. The aforementioned system, therefore, fails to execute the appropriate vehicle behavior control in consideration with the correcting steering operation performed by the vehicle operator.

SUMMARY OF THE INVENTION

It is an object of the invention to provide a vehicle behavior control system that executes the vehicle behavior control in consideration with the amount of the correcting operation of the vehicle operator for appropriate vehicle behavior control in accordance with the vehicle operator's correcting operation.

According to the invention, in a vehicle behavior control system, a normal vehicle state value is obtained based on an operation amount of a vehicle operating member performed by a vehicle operator, and a vehicle behavior is controlled based on an actual vehicle state value and the normal vehicle state value. The vehicle behavior control system estimates an amount of correction with respect to the vehicle operating member by the vehicle operator such that the normal vehicle state value is obtained based on the estimated amount of correction and an actual operation amount. In another vehicle behavior control system, a normal vehicle state value is obtained based on an operation amount of a vehicle operating member performed by a vehicle operator, and a vehicle behavior is controlled based on an actual vehicle state value and the normal vehicle state value. The vehicle behavior control system estimates an amount of correction with respect to the vehicle operating member performed by the vehicle operator such that the normal vehicle state value is corrected based on the estimated amount of correction. In another vehicle behavior control system, a normal vehicle state value is obtained based on an operation amount of a vehicle operating member performed by a vehicle operator, and an actuator of the vehicle is controlled in accordance with a control value for adjusting a vehicle state value into the normal vehicle state value so as to control a vehicle behavior. The vehicle behavior control system estimates an amount of correction with respect to the vehicle operating member performed by the vehicle operator, based on which the control value is corrected.

In the aforementioned vehicle behavior control system, the estimated amount of correction may be subtracted from the actual operation amount to obtain a corrected operation amount, based on which the normal vehicle state value may be obtained.

According to an embodiment of the invention, the amount of the correction of the vehicle operating member performed by the vehicle operator is estimated, and the normal vehicle state value is obtained based on the estimated correction amount and the actual operation amount. Accordingly, the normal vehicle state value reflects the estimated correction amount, which allows the appropriate vehicle behavior control in consideration with the correction amount of the vehicle operator.

According to the embodiment of the invention, the corrected operation amount is obtained by subtracting the estimated correction amount from the actual operation amount. Then the normal vehicle state value is obtained based on the corrected operation amount. This makes it possible to obtain the appropriate normal vehicle state value that reflects the amount of correction performed by the vehicle operator.

According to another embodiment of the invention, an amount of the correction of the vehicle operating member performed by the vehicle operator is estimated. Then the normal vehicle state value is corrected based on the estimated correction amount. This makes it possible to control the vehicle behavior based on the appropriate normal vehicle state value that reflects the actual vehicle state value and the amount of correction performed by the vehicle operator.

According to another embodiment of the invention, the amount of correction of the vehicle operating member performed by the vehicle operator is estimated, and the control value is corrected based on the estimated correction amount. This makes it possible to control the actuator in accordance with the appropriate control value that reflects the amount of correction performed by the vehicle operator.

In the aforementioned embodiment, the vehicle operating member may be a steering wheel of the vehicle. The operation amount of the vehicle operator may be defined as the steering amount, and the amount of correction performed by the vehicle operator may be defined as the amount of operation for correcting the steering.

In the aforementioned embodiment, the vehicle behavior may be estimated based on the actual vehicle state value and the normal vehicle state value. The vehicle behavior may be then controlled based on the estimated results.

In the aforementioned embodiment, the normal vehicle state value may be obtained based on the amount of operation of the vehicle operating member. The actuator may be controlled in accordance with the control value that brings the vehicle state value into the normal vehicle state value so as to control the vehicle behavior.

In the aforementioned embodiment, each braking force of the wheels may controlled such that the vehicle behavior is controlled.

In the aforementioned embodiment, the excess yaw moment that acts on the vehicle during braking operation, which is caused by the characteristic of the road surface may estimated. The corrected steering amount may be then estimated based on the estimated excess yaw moment.

In the aforementioned embodiment, it may be determined whether the braking force is applied to the vehicle running on the road with uneven friction coefficient. If positive determination is made, the excess yaw moment may be estimated based on a target braking force applied to the wheels, which is obtained for stable braking operation of the vehicle, on the assumption that the road surface has uniform friction coefficient, and a braking force applied to each wheel of the vehicle.

FIRST EMBODIMENT

Figure 1:
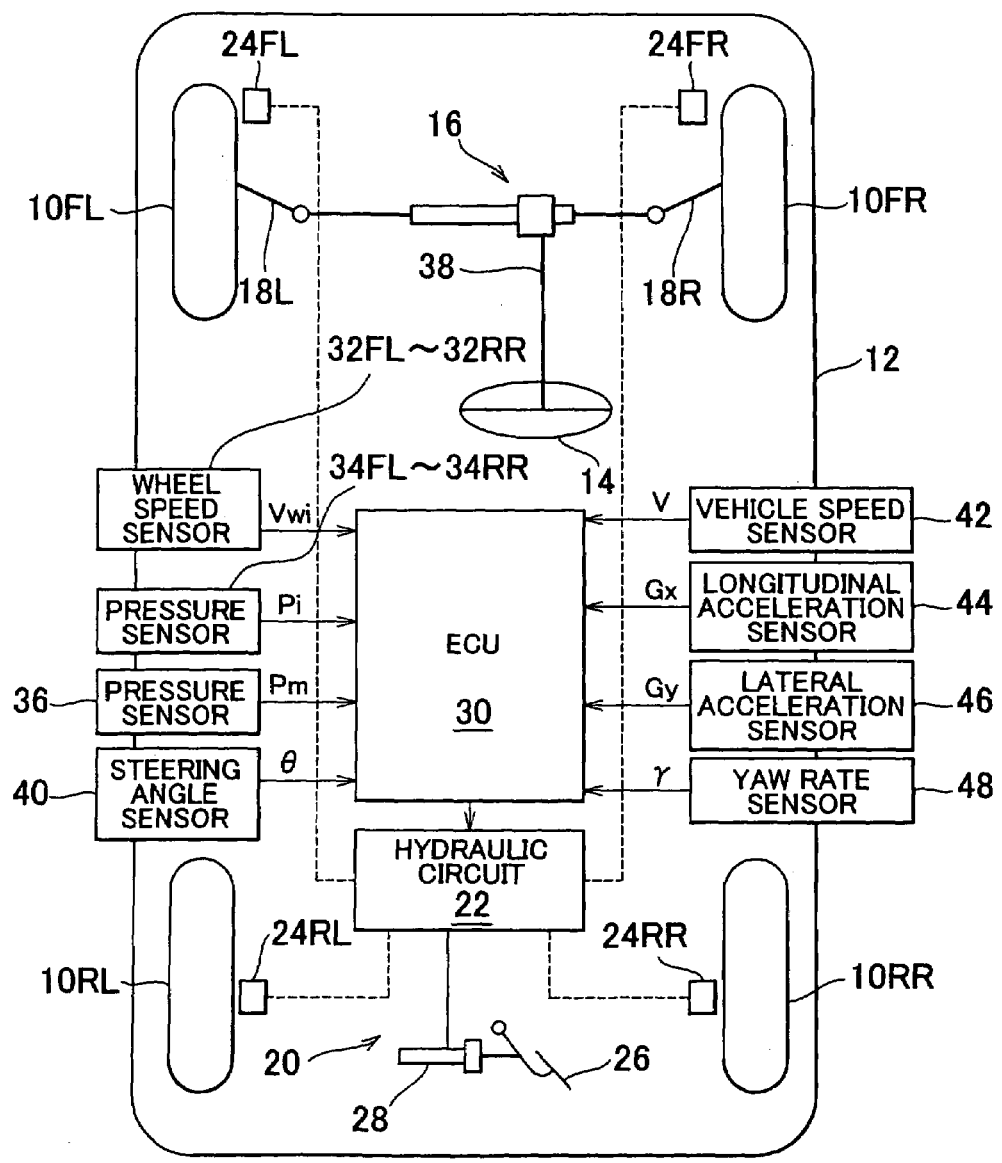
FIG. 1 is a schematic view of a behavior control system for a vehicle in accordance with a first embodiment of the invention.

FIG. 1 schematically shows a vehicle behavior control system in accordance with a first embodiment of the invention.

Referring to FIG. 1, a vehicle includes left and right front wheels 10FL and 10FR, and left and right rear wheels 10RL and 10RR, respectively. The left and right front wheels 10FL and 10FR as driven/steering wheels are steered by a power steering device 16 of rack and pinion type which is driven in response to turning of the steering wheel 14 performed by a vehicle operator via tie rods 18L and 18R.

Each braking force applied to the respective wheels is controlled by adjusting each braking pressure of wheel cylinders 24FR, 24FL, 24RR, and 24RL through a hydraulic circuit 22 of a brake system 20. The hydraulic circuit (not shown) 22 includes a reservoir, an oil pump, various valve devices and the like. In the normal state, each braking pressure of the respective wheel cylinders is controlled by a master cylinder 28 that is driven in accordance with the depressing amount of a brake pedal 26 by the vehicle operator, and is further controlled by an electronic control unit (ECU) 30 in case of necessity.

The wheels 10FL to 10RR are provided with wheel speed sensors 32FL to 32RR, respectively for detecting the respective wheel speeds Vwi(i=fl, fr, rl, rr). Wheel cylinders 24FL to 24RR of the wheels 10FL to 10RR are provided with pressure sensors 32FL to 34RR, respectively for detecting pressures (braking pressure) Pi(i=fl, fr, rl, rr) in the wheel cylinders. The master cylinder 28 is provided with a pressure sensor 36 for detecting a master cylinder pressure Pm.

A steering shaft 38 is provided with a steering angle sensor 40 for detecting a steering angle θ. A vehicle 12 is provided with a vehicle speed sensor 42 for detecting a vehicle speed V, a longitudinal acceleration sensor 44 for detecting an acceleration Gx in a longitudinal direction of the vehicle, a lateral acceleration sensor 46 for detecting an acceleration Gy in a lateral direction of the vehicle, and a yaw rate sensor 48 for detecting a yaw rate γ of the vehicle, respectively. The steering angle sensor 40, the lateral acceleration sensor 46, and the yaw rate sensor 48 detect the steering angle θ, lateral acceleration Gy, and the yaw rate γ, respectively assuming that the left turning direction of the vehicle is defined as an orthodromic direction.

Referring to FIG. 1, an ECU (electronic control unit) 30 receives inputs of signals representing the wheel speed Vwi each detected by the wheel speed sensors 32FL to 32RR, the braking pressure Pi each detected by the pressure sensors 34FL to 34RR, the master cylinder pressure Pm detected by the pressure sensor 36, the steering angle θ detected by the steering angle sensor 40, the vehicle speed V detected by the vehicle speed sensor 42, the longitudinal acceleration Gx detected by the longitudinal acceleration sensor 44, the lateral acceleration Gy detected by the lateral acceleration sensor 44, and the yaw rate γ detected by the yaw rate sensor 48, respectively. The ECU 30 includes a micro-computer generally provided with CPU, ROM, RAM and I/O port devices (not shown), which are connected one another via a bilateral common bus.

Figure 2:
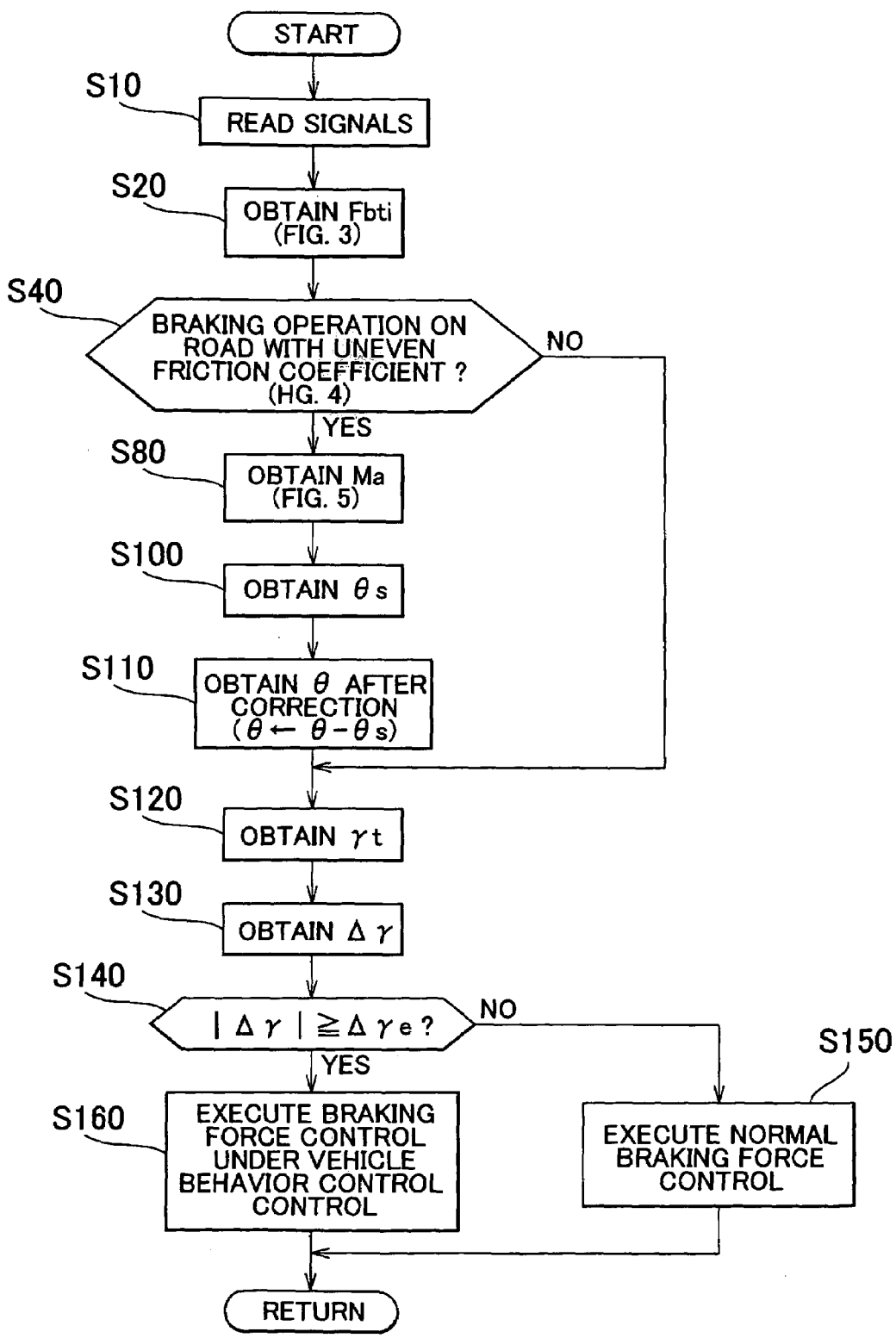
FIG. 2 is a flowchart of a main routine of the vehicle behavior control in accordance with the first embodiment.

The ECU 30 obtains a normal yaw rate γt of the vehicle indicating the amount of the vehicle state based on the steering angle θ through execution of the routine shown in a flowchart as shown in FIG. 2. Then a difference between the normal yaw rate γt and the yaw rate γ detected by the yaw rate sensor 48, that is, Δγ is obtained. The vehicle behavior is determined based on the obtained difference Δγ. Id it is determined that the vehicle behavior is in a stable state, a target longitudinal acceleration Gxt of the vehicle is obtained based on the braking operation amount performed by the vehicle operator. Then each of target braking forces Fbti(i=fl, fr, rl, rr) of the respective wheels is obtained based on the obtained longitudinal acceleration Gxt so as to be proportional to the vertical load of the wheel. Each braking pressure Pi of the respective wheels is controlled such that each braking force applied to the respective wheels becomes the target braking force Fbti.

If it is determined that the vehicle behavior is deteriorated, the ECU 30 obtains the target braking force Fbti for each of the wheels such that the yaw rate γ becomes the normal yaw rate γt based on the yaw rate difference Δγ. Then the braking pressure Pi for each of the wheels is controlled to become the target braking force Fbti such that the vehicle behavior is stabilized.

The ECU 30 determines whether the braking force is applied to the vehicle running on the road with uneven friction coefficient. If it is determined that the braking force is applied to the vehicle running on the road, an excess yaw moment Ma acting on the vehicle, which is caused by the difference between the target braking force Fbti and the actual braking force Fbi is obtained. Then a corrected steering amount θs that is expected to offset the excess yaw moment Ma by the vehicle operator is obtained based on the excessive moment Ma. The corrected steering angle θs is subtracted from the steering angle θ to obtain the steering angle θ after correction, which is used to obtain the normal yaw rate γt of the vehicle.

The ECU 30 obtains a vehicle speed Vb and braking slip amounts Sbi(i=fl, fr, rl, rr) for the respective wheels based on the wheel speed Vwi of each wheel using a known technology in the relevant field. If a condition for starting an anti-skid control is established when any of the braking slip amount SBi of the wheels becomes larger than a reference value based on which the anti-skid control (ABS control) is started, the anti-skid control is started for increasing/decreasing the pressure within the wheel cylinder until the braking slip amount falls within a predetermined range until establishment of the condition for completing the anti-skid control.

Referring to a flowchart shown in FIG. 2, the vehicle behavior control routine according to the first embodiment will be described. The control routine is started upon turning ON of an ignition switch (not shown) and repeatedly executed at a predetermined cycle.

In step S10, signals each indicating the wheel speed Vwi detected by the wheel speed sensors 32FL to 32RR, respectively are read. Then in step S20, each target braking force Fbti(i=fl, fr, rl, rr) of the respective wheels is obtained by executing the sub-routine shown in FIG. 3.

Figure 4:
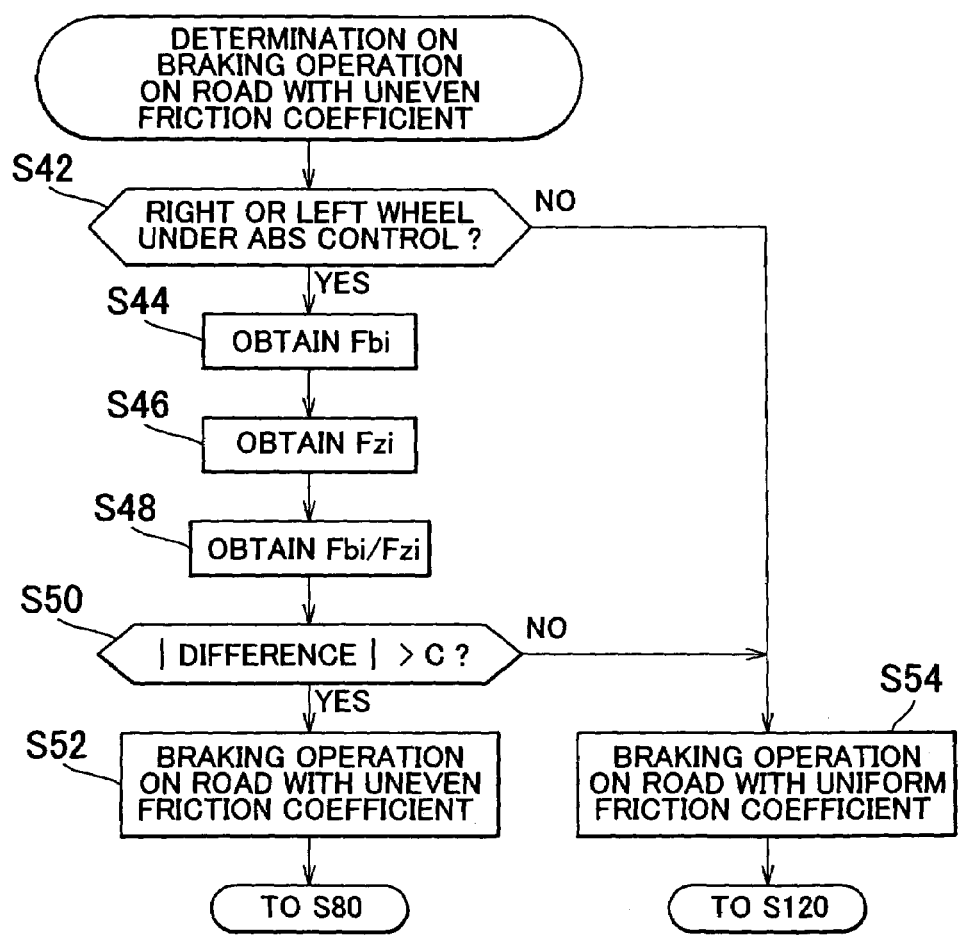
FIG. 4 is a flowchart of a sub-routine executed in step 60 of the flowchart shown in FIG. 2 for obtaining each target braking force Fbti applied to the respective wheels.

In step S40, the sub-routine shown in FIG. 4 is executed to determine whether the braking force is applied to the vehicle running on the road with uneven friction coefficient. If NO is obtained in step S40, that is, it is determined that the braking force is applied to the vehicle running on the road with uniform friction coefficient, the process proceeds to step S120. If YES is obtained in step S40, that is, it is determined that the braking force is applied to the vehicle running on the road with uneven friction coefficient, the process proceeds to step S80.

Figure 5:
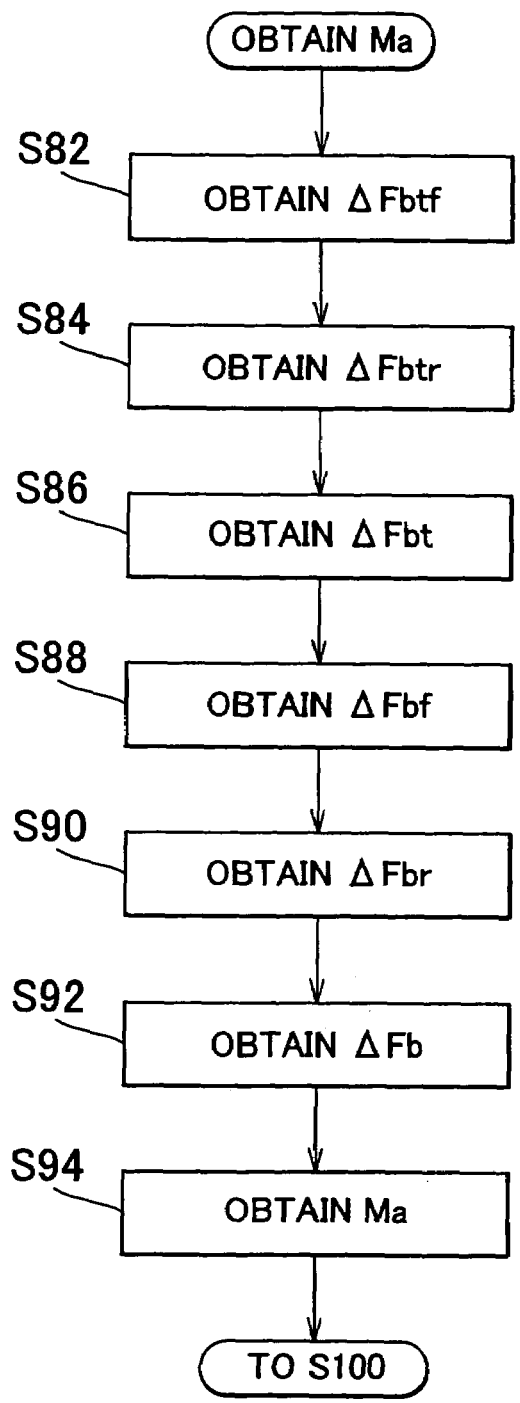
FIG. 5 is a sub-routine executed in step 80 of the flowchart shown in FIG. 2 for obtaining an excess yaw moment Ma.

In step S80, the sub-routine shown in FIG. 5 is executed to obtain an actual braking force Fbi(i=fl, fr, rl, rr) of the respective wheels as well as the excess yaw moment Ma acting on the vehicle owing to the difference between the target braking force Fbti and the actual braking force Fbi.

In step S100, the corrected steering angle θs as the value expected to offset the excess yaw moment Ma performed by the vehicle operator is obtained based on the excess yaw moment Ma. Then in step S110, the corrected steering angle θs is subtracted from the steering angle θ detected by the steering angle sensor 40 so as to obtain the steering angle θ after correction.

Figure 9:
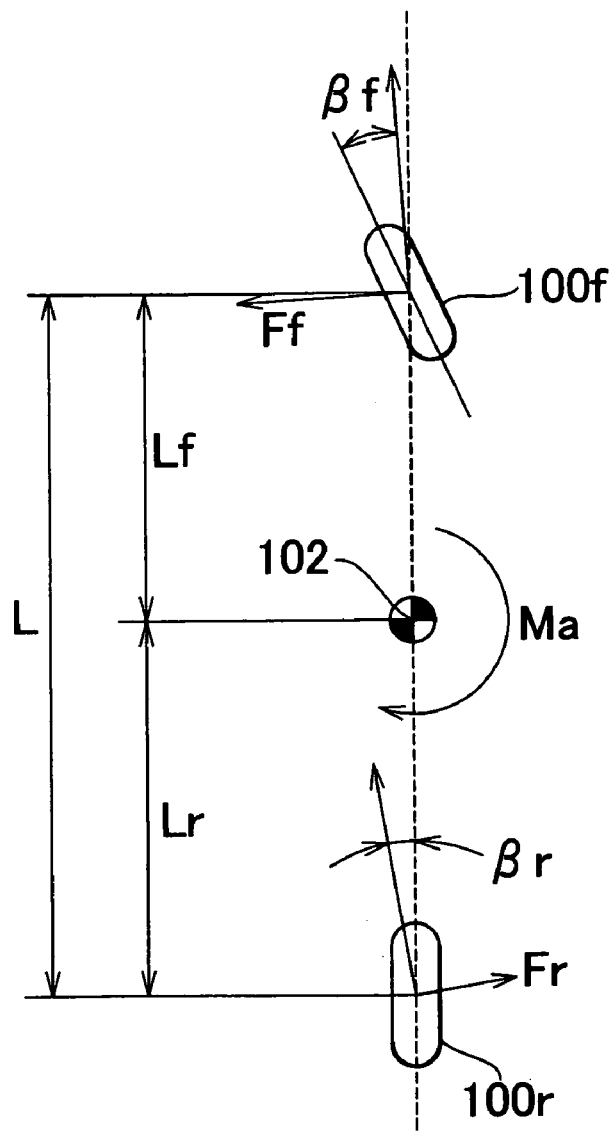
FIG. 9 is a view representing how the corrected steering angle θs of a two-wheel vehicle to offset the excess yaw moment Ma.

In FIG. 9 that schematically shows a two-wheel vehicle, each cornering force of a front wheel 100f and a rear wheel 100r is designated as Ff and Fr, and each distance between the center 102 of the vehicle and the front axle, and the center 102 and the rear axle is designated as Lf and Lr, respectively. The wheel base of the vehicle is designated as L(Lf+Lr). Each slip angle of the front wheel and the rear wheel is designated as βf and βr, and each cornering power of the front wheel and the rear wheel is designated as Kf and Kr, respectively.

In consideration with the balance of the force in the linear range of the tire, it is necessary to establish the following equations (1) to (3) to offset the excessive moment Ma without generating the lateral acceleration of the vehicle. Therefore in step S100, the corrected steering angle θs is obtained by the equation (4).

$$Ma = Lf\beta fKf + Lr\beta rKr \quad (1)$$

$$\beta fKf = \beta rKr \quad (2)$$

$$\theta s = \beta f + \beta r \quad (3)$$

$$\theta s = (1/\beta f + 1/\beta r)Ma/L \quad (4)$$

In step S120, a reference yaw rate γe is obtained by the following equation (5), where N represents a steering gear ratio, H represents a wheel base, and Kh represents a stability factor. Also the normal yaw rate γt is obtained by the following equation (6) where T represents a time constant and s represents a Laplace operator. The reference yaw rate γe may be obtained using the lateral acceleration Gy of the vehicle in consideration with the dynamic yaw rate.

$$\gamma e = V\theta/(1+KhV^2)NH \quad (5)$$

$$\gamma t = \gamma e/(1+Ts) \quad (6)$$

In step S130, a yaw rate difference Δγ as the difference between the normal yaw rate γt and the yaw rate γ detected by the yaw rate sensor 48 is obtained. In step S140, it is determined whether the absolute value of the yaw rate difference Δγ is equal to or greater than the reference value Δγe so as to determine the deterioration in the vehicle behavior. If YES is obtained in step S140, the process proceeds to step S160. If NO is obtained in step S140, the process proceeds to step S150.

In step S150, the normal braking force control is executed, that is, each braking pressure Pi of the respective wheels is controlled such that each braking force Fbi of the respective wheels becomes the target braking force Fbti that has been obtained in step S20. In step S160, the braking force control under the vehicle behavior control is executed, that is, each braking force applied to the respective wheels is controlled such that the yaw rate difference Δγ is reduced through the technology in the related field. This makes it possible to stabilize the vehicle behavior.

Figure 3:
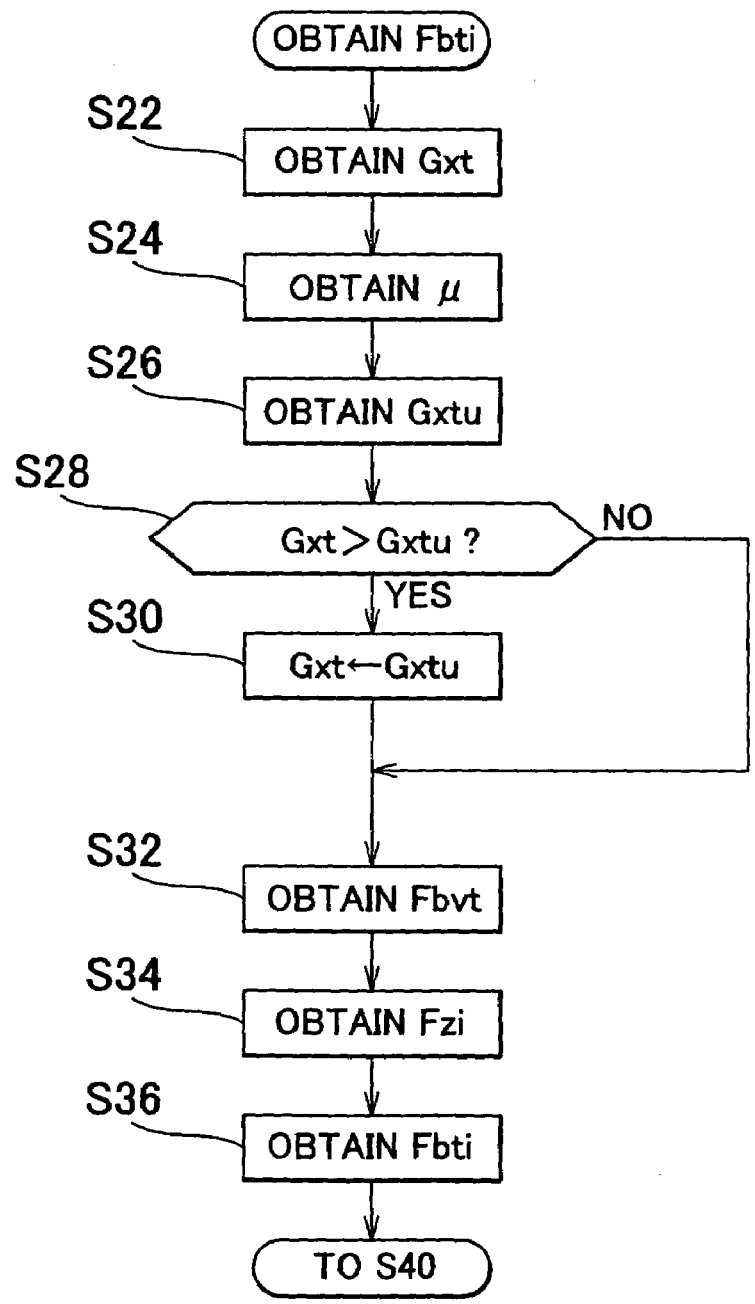
FIG. 3 is a flowchart of a sub-routine executed in step 20 of the flowchart shown in FIG. 2 for making a determination with respect to a braking operation during running on a road with uneven friction coefficient.

Referring to FIG. 3, the sub-routine executed in step S20 shown in the flowchart of FIG. 1 for obtaining the target braking force Fbti applied to each of the wheels will be described hereinafter.

Figure 6:
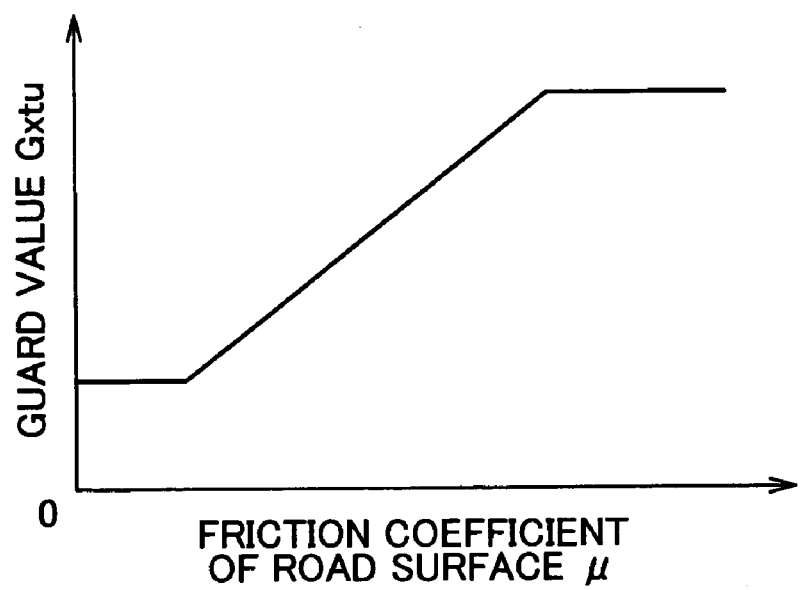
FIG. 6 is a graph showing a relationship between a friction coefficient μ and a guard value Gxtu during running at the target longitudinal acceleration.

In step S22, the target longitudinal acceleration Gxt of the vehicle is obtained based on the master cylinder pressure Pm. In step S24, the friction coefficient μ of the road surface is obtained through the known technology. In step S26, a guard value Gxtu with respect to the target longitudinal acceleration Gxt of the vehicle is obtained in reference to a map corresponding to the graph shown in FIG. 6.

In step S28, it is determined whether the target longitudinal acceleration Gxt is larger than the guard value Gxtu. If NO is obtained, the process proceeds to step S32. If YES is obtained, the target longitudinal acceleration Gxt is set to the guard value Gxtu in step S30, and the process proceeds to step S32.

In step S32, the target braking force Fbvt applied to the vehicle is obtained by multiplying the target longitudinal acceleration Gxt by the mass M of the vehicle. In step S34, the vertical load of each of the wheels Fzi(i=fl, fr, rl, rr) in the state where the vehicle is stopped is obtained through the following equation (7), where Kx and Ky represent the coefficient with respect to the longitudinal acceleration Gx and the lateral acceleration Gy, respectively.

$$Fzi = Fzoi + KxGx + KyGy \quad (7)$$

In step S36, the target braking force Fbti applied to each of the respective wheels, which satisfies the following equations (8) and (9) is obtained using, for example, the least-squares method.

$$Fxi \propto Fzi \quad (8)$$

$$Fbvt = SFbti \quad (9)$$

Referring to FIG. 4, the sub-routine for determining the braking operation of the vehicle running on the road with uneven friction coefficient executed in step S40 of the flowchart shown in FIG. 2 will be described.

In step S42, it is determined whether one of the left and right front wheels or one of the left and right rear wheels is under ABS control so as to determine if one of the left and right wheels is locked. If NO is obtained in step S42, the process proceeds to step S54. If YES is obtained in step S42, the process proceeds to step S44.

In step S44, the wheel acceleration Vdwi is obtained as a differential value of each wheel speed Vwi of the respective wheels, and the braking force of each wheel is obtained through the following equation (10) where the Kpi(i=fl, fr, rl, rr) represents the coefficient for conversion between the braking pressure and the braking force, and the Iwi(i=fl, fr, rl, rr) represents a rotational inertia moment of the wheel.

$$Fbi = KpiPm + IwiVwdi \quad (10)$$

In step S46, the vertical load Fzi of each wheel is obtained through the equation (3), and in step S48, the ratio of the braking force Fbi to the vertical load Fzi, that is, Fbi/Fzi is obtained for each of the wheels.

In step S50, it is determined whether the absolute value of the difference in the ratio Fbi/Fzi with respect to the left and right front wheels or the left and right rear wheels in the case where either left or right side of the front or rear wheels is locked as being determined in step S42 exceeds a reference value C (positive constant). That is, it is determined whether the friction coefficient at the left side of the road surface is greatly different from that at the right side of the road surface. If YES is obtained in step S50, the process proceeds to step S52 in which it is determined that the braking force is applied to the vehicle running on the road with uneven friction coefficient. If NO is obtained in step S50, the process proceeds to step S54 in which it is determined that the braking force is applied to the vehicle running on the road with uniform friction coefficient.

Referring to FIG. 5, the sub-routine for obtaining the excess yaw moment Ma executed in step S80 will be described.

In step S82, a difference in the target braking force between the left front wheel and the right front wheel ΔFbtr(=Fbtfl−Fbtfr) is obtained based on the target braking force Fbti of each of the respective wheels as being obtained in step S20 as described above. Then in step S84, a difference in the target braking force between the left rear wheel and the right rear wheel ΔFbtr(=Fbtrl−Fbtrr) is obtained. In step S86, the differences in the target braking force ΔFbtf and ΔFbtr are added to obtain the difference in the target braking force between left wheels and right wheels of the vehicle, that is, ΔFbt.

In step S88, a difference in the braking force applied to the wheels between the left front wheel and the right front wheel, that is, ΔFbf(=Fbfl−Fbfr) is obtained based on the braking force Fbi each applied to the respective wheels as being obtained in step S64. In step S90, a difference in the braking force applied to the wheels between the left rear wheel and the right rear wheel, that is, ΔFbr(=Fbrl−Fbrr) is obtained. In step S92, the differences in the braking force ΔFbf and ΔFbr are added to obtain the difference in the braking force applied between the left wheels and the right wheels, that is, ΔFb.

In step S94, the excess yaw moment Ma acting on the vehicle, that is caused by the difference in the braking force applied between the left wheels and the right wheels is obtained based on the difference in the target braking force applied between the left and right wheels, that is, ΔFbt and the difference in the braking force applied between the left and right wheels, that is, ΔFb through the following equation (11) where Tr represents the tread of the vehicle.

$$Ma = Tr(\Delta Fbt - \Delta Fb) \quad (11)$$

As an alternative way to obtain the excess yaw moment Ma, a target braking force to be applied to each wheel of the vehicle for the stable braking operation, is estimated on the assumption that the road surface has uniform friction coefficient, and a target yaw moment may be estimated based on the estimated target braking force. Furthermore, a yaw moment applied to the vehicle is estimated based on a braking force applied to each of the wheels, and the excess yaw moment Ma may be obtained based on the target yaw moment and the actual yaw moment.

According to a first embodiment, each target braking force Fbti applied to the respective wheels is obtained based on the master cylinder pressure Pm in step S20 so as to be proportional to the vertical load of the wheel. In step S120, the normal yaw rate γt of the vehicle is obtained based on the steering angle θ. In step S130, the yaw rate difference Δγ is obtained as the difference between the normal yaw rate γt and the actual yaw rate γ. In step S140, it is determined whether the absolute value of the yaw rate difference Δγ is equal to or larger than the reference value Δγe so as to make a determination as to deterioration in the vehicle behavior. If it is determined that the vehicle behavior is in a stable state, step S150 is executed to perform the normal braking force control. Under the normal braking force control, each braking force Pi applied to the respective wheels is controlled such that the braking force each applied to the wheels becomes the target braking force Fbti.

If it is determined that the vehicle behavior has been deteriorated, the target braking force Fbti each applied to the respective wheels is obtained based on the yaw rate difference Δγ such that the yaw rate γ becomes the normal yaw rate γt in step S160. The braking force control under the behavior control is executed where the braking pressure Pi for the respective wheels is controlled such that the braking force each applied to the wheels becomes the target braking force Fbti.

According to the first embodiment, it is determined whether the braking force is applied to the vehicle running on the road with uneven friction coefficient in step S40. If it is determined that the braking force is applied to the vehicle running on the aforementioned road, the actual braking force Fbi each applied to the respective wheels is obtained in step S80, and the excess yaw moment Ma acting on the vehicle, which is caused by the difference between the target braking force Fbti and the actual braking force Fbi is obtained. Based on the excess yaw moment Ma, the corrected steering angle θs, that is, the corrected amount of steering expected to be performed by the vehicle operator so as to offset the excess yaw moment, is obtained in step S100. The thus obtained corrected steering angle θs is subtracted from the steering angle θ detected by the steering angle sensor 40 in step S110. Then in step S120, the normal yaw rate γt of the vehicle is obtained based on the steering angle θ that has been corrected.

In the case where the braking force is applied to the vehicle running on the road with uneven friction coefficient, and the vehicle operator performs steering operation in order to offset the excess yaw moment acting on the vehicle, the excess yaw moment Ma is estimated. Then the corrected steering angle θs is estimated based on the excess yaw moment Ma. The normal yaw rate γt of the vehicle is obtained based on the steering angle θ that has been corrected with the corrected steering angle θs. Compared with the case where the normal yaw rate ?t is obtained based on the steering angle θ detected by the steering angle sensor 40, the invention according to the first embodiment makes it possible to obtain the normal yaw rate γt suitable for the vehicle operation desired by the vehicle operator. This may allow an appropriate determination to be made with respect to the vehicle behavior based on the appropriate yaw rate difference Δγ. Further, this may stabilize the vehicle behavior more appropriately based on the appropriate yaw rate difference Δγ.

SECOND AND THIRD EMBODIMENTS

Figure 7:
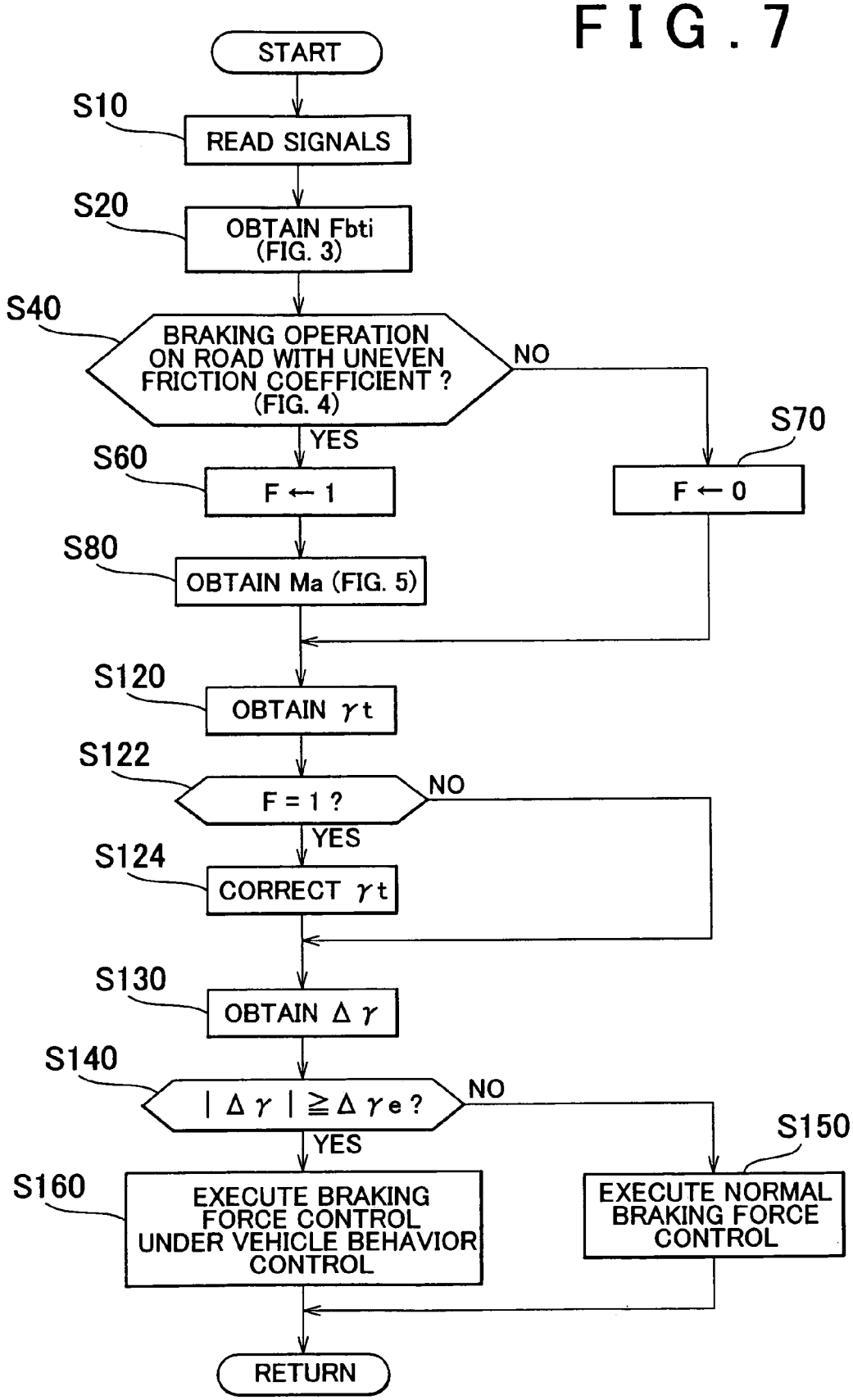
FIG. 7 is a flowchart of a routine for the vehicle behavior control in accordance with a second embodiment of the invention.
Figure 8:
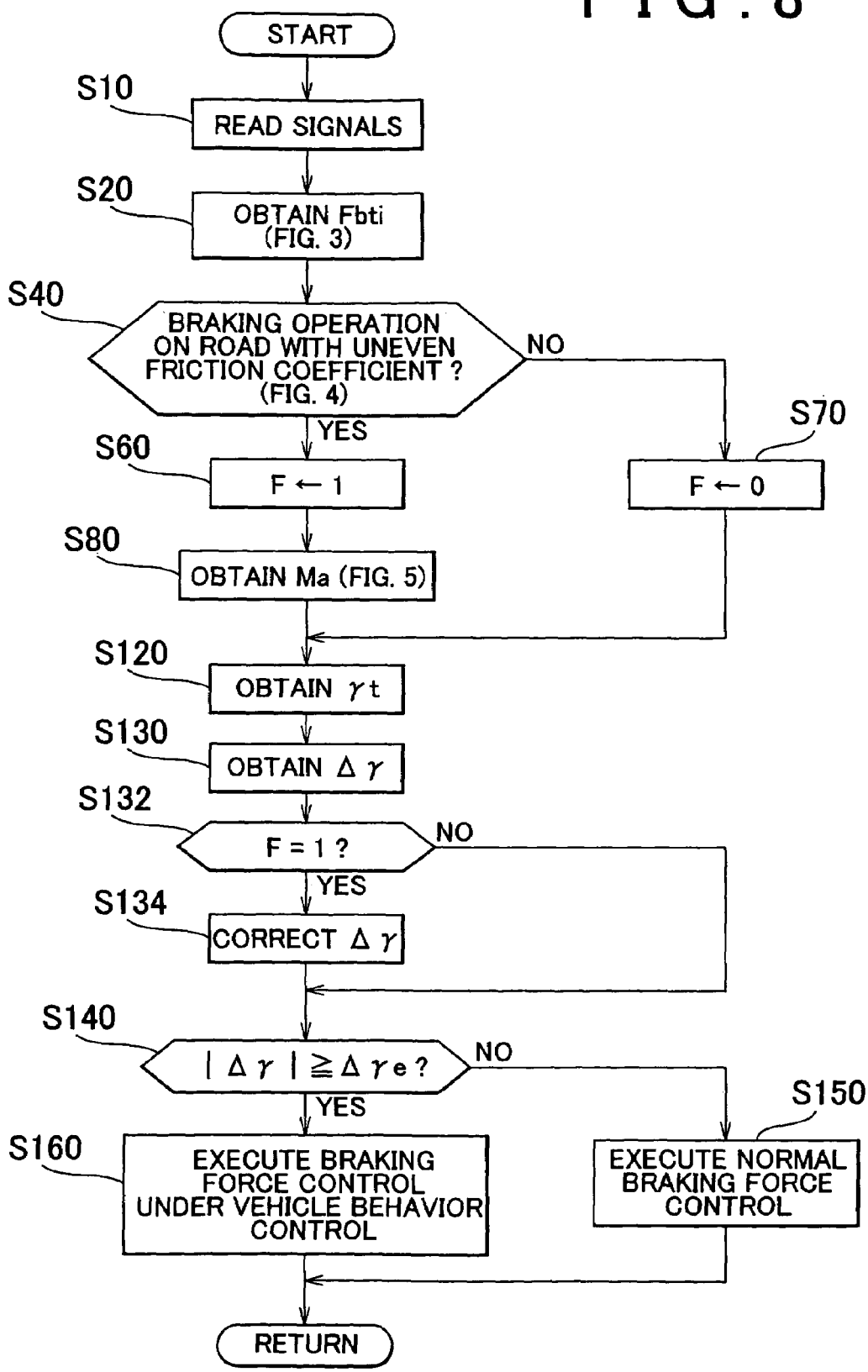
FIG. 8 is a flowchart of a routine for the vehicle behavior control in accordance with a third embodiment of the invention.

Each flow chart shown in FIGS. 7 and 8 represents the vehicle behavior control routine according to the second embodiment and the third embodiment, respectively. The numeral of step that is the same as that shown in the flowchart of FIG. 7 or 8 will be identical to that of step shown in the flowchart of FIG. 2.

Referring to the flowchart according to the second embodiment as shown in FIG. 7, if YES is obtained in step S40, that is, it is determined that the braking force has been applied to the vehicle running on the road with uneven friction coefficient, a flag F is set to 1 in step S60, and the process proceeds to step S80. If NO is obtained in step S40, the flag F is reset to 0, and the process proceeds to step S120.

In the flowchart shown in FIG. 7, steps that correspond to steps S100 and S110 of the flowchart shown in FIG. 2 are not executed. Upon completion of execution in step S80, step S120 is executed such that the normal yaw rate γt is obtained based on the steering angle θ detected by the steering angle sensor 40.

Then in step S122 subsequent to step S120, it is determined whether the flag F is set to 1. If NO is obtained in step S122, the process proceeds to step S130. If YES is obtained in step S122, the process proceeds to step S124. In step S124, based on the excess yaw moment Ma, a correction amount γta with respect to the normal yaw rate γt of the vehicle for reducing the influence of the excess yaw moment Ma is obtained. The normal yaw rate γt is corrected by the correction amount γta. Then in step S130, the yaw rate difference Δγ is obtained based on the actual yaw rate γ and the normal yaw rate γt after correction.

In the case where the braking force is applied to the vehicle running on the road with uneven friction coefficient, and the steering operation is performed by the vehicle operator to offset the excess yaw moment Ma acting on the vehicle, the excess yaw moment Ma is estimated. An amount of correction with respect to the steering angle, which is performed by the vehicle operator, is estimated based on the excess yaw moment Ma, and the normal yaw rate γt of the vehicle is corrected based on the estimated excess yaw moment Ma while considering the estimated amount of correction with respect to the steering angle. Accordingly the normal yaw rate γt suitable for the vehicle operation desired by the vehicle operator can be obtained compared with the case where the normal yaw rate γt is not corrected based on the excess yaw moment Ma. This makes it possible to appropriately determine the vehicle behavior based on the appropriate yaw rate difference Δγ as in the first embodiment. This may also allow the vehicle behavior to be stabilized based on the appropriate yaw rate difference Δγ.

Referring to the flowchart shown in FIG. 8 according to the third embodiment, steps S40, S60, S70 are executed in the same manner as in the second embodiment. Unlike the first embodiment, steps S100 and S110 are not executed. In this embodiment, upon completion of execution of step S80, step S120 is executed to obtain the normal yaw rate γt based on the steering angle θ detected by the steering angle sensor 40.

In step S132 subsequent to step S130, it is determined whether the flag F is set to 1. If NO is obtained in step S132, the process proceeds to step S140. If YES is obtained in step S132, the process proceeds to step S134. In step S134, based on the excess yaw moment Ma, the correcting amount $\Delta\gamma a$ with respect to the yaw rate difference $\Delta\gamma$ for reducing the influence of the excess yaw moment Ma is obtained. Then the yaw rate difference $\Delta\gamma$ is corrected with the obtained correcting amount $\Delta\gamma a$. The determination in step S140 is executed based on the yaw rate difference $\Delta\gamma$ that has been corrected.

In the case where the braking force is applied to the vehicle running on the road with uneven friction coefficient, and the vehicle operator performs the correction of the steering operation to offset the excess yaw moment Ma acting on the vehicle, the excess yaw moment Ma is estimated. Then, an amount of correction with respect to the steering angle, which is performed by the vehicle operator, is estimated, and the yaw rate difference $\Delta\gamma$ is corrected based on the excess yaw moment Ma while considering the estimated amount of correction with respect to the steering angle. Therefore, the yaw rate difference $\Delta\gamma$ with which the vehicle operation desired by the vehicle operator reflects can be obtained compared with the case where the yaw rate difference $\Delta\gamma$ is not corrected based on the excess yaw moment Ma. This makes it possible to determine the vehicle behavior appropriately based on the accurate yaw rate difference $\Delta\gamma$ as well as to stabilize the vehicle behavior appropriately based on the yaw rate difference $\Delta\gamma$.

When the determination is made as to whether the braking force is applied to the vehicle running on the road with uneven friction coefficient in step S40, the sub-routine shown in FIG. 4 is started. In the sub-routine, the ratio of the braking force Fbi to the vertical load Fzi, that is, Fbi/Fzi is obtained in the case where either one of the left and right wheels is locked. Then it is determined whether the absolute value of the difference in the ratio Fbi/Fzi between the left and the right wheels exceeds the reference value C so as to judge the degree of the difference in the friction coefficient between the right side and the left side of the road surface. This makes it possible to accurately judge the degree of the difference in the friction coefficient compared with the case in which the determination is made based on the difference in the actual braking force or in the braking slip ratio between the left wheels and the right wheels.

In the sub-routine shown in FIG. 3, the target acceleration Gxt of the vehicle is obtained based on the braking operation amount performed by the vehicle operator. The target braking force Fbt for each wheel is obtained based on the target acceleration Gxt so as to be proportional to the vertical load of each wheel. The excess yaw moment Ma acting on the vehicle, which is caused by the difference between the target braking force Fbti and the actual braking force Fbi is obtained. In the first embodiment, the corrected steering amount $\theta s$ is obtained based on the excess yaw moment Ma. In the second embodiment, the normal yaw rate $\gamma t$ of the vehicle is corrected. In the third embodiment, the yaw rate difference $\Delta\gamma$ is corrected. This makes it possible to accurately obtain the corrected steering amount $\theta s$ and correct the normal yaw rate $\gamma t$ of the vehicle as well as correct the yaw rate difference $\Delta\gamma$ compared with the case where the excess yaw moment is obtained based on the difference in the actual braking force between the left wheels and the right wheels.

As the invention has been described with respect to the preferred embodiments, it is to be understood that the invention is not limited to the aforementioned embodiments, and can be modified into various forms within a scope thereof.

In the aforementioned embodiment, the vehicle behavior is determined based on the difference $\Delta\gamma$ between the normal yaw rate as the value of the normal state of the vehicle and the actual yaw rate $\gamma$ such that the vehicle behavior is controlled. However, the determination and control of the vehicle behavior may be executed using known technology in the related field so long as at least one of such determination and control is made based on the actual value and normal value for representing the vehicle state.

In the aforementioned embodiments, the ratio of the braking force Fbi to the vertical load Fzi of the wheel is obtained in the case where one of the left and the right wheels is locked, and the determination is made whether the absolute value of the difference in the ratio Fbi/Fzi between the left and the right wheels exceeds the reference value C. The resultant determination is made to judge the braking state of the vehicle running on the road with uneven friction coefficient. However, judgment of the braking state of the vehicle may be made using known technology, for example, based on the difference in the braking slip ratio between the left and right wheels.

In the aforementioned embodiments, the target braking force Fbti applied to each wheel is obtained as the value that is proportional to the vertical load of each wheel based on the target acceleration Gxt in accordance with the braking operation amount performed by the vehicle operator. However, the target braking force Fbti may be obtained using known technology so long as it is the value indicating the amount of the braking operation performed by the vehicle operator.

In the aforementioned embodiments, the normal yaw rate is used as the amount of the normal vehicle state. However, the value of the normal vehicle state may take an arbitrary form so long as it indicates the normal state of the vehicle, for example, the normal yaw moment of the vehicle. Also the steering wheel is used as the vehicle operating member, and the operation amount of the vehicle operator represents the steering amount. However, the brake pedal may be used as the vehicle operating member, and the braking operation amount may represent the operation amount of the vehicle operation member.

In the illustrated embodiment, the controller (the ECU 30) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or mote peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicle behavior control system comprising a controller that (1) obtains a normal vehicle state value based on an operation amount of a vehicle operating member performed by a vehicle operator, (2) obtains an actual vehicle state value, and (3) controls a vehicle behavior based on the actual vehicle state value and the normal vehicle state value, wherein the controller estimates an amount of correction by the vehicle operator based on an excess yaw moment, and obtains the normal vehicle state value based on the estimated amount of correction and an actual operation amount.

2. The vehicle behavior control system according to claim 1, wherein the controller obtains a corrected operation amount by subtracting the estimated amount of correction from the actual operation amount, and obtains the normal vehicle state value based on the corrected operation amount.

3. The vehicle behavior control system according to claim 1, wherein the controller estimates the vehicle behavior based on the actual vehicle state value and the normal vehicle state value, obtaining an estimated result, and controls the vehicle behavior based on the estimated result.

4. The vehicle behavior control system according to claim 1, wherein the controller obtains the normal vehicle state value based on the amount of operation with respect to the vehicle operating member performed by the vehicle operator, and controls the vehicle behavior by controlling an actuator of the vehicle in accordance with a control value that brings the actual vehicle state value into the normal vehicle state value.

5. The vehicle behavior control system according to claim 1, wherein the controller controls the vehicle behavior by controlling a braking force to be applied to each of the wheels.

6. The vehicle behavior control system according to claim 1, wherein the vehicle operating member is a steering member of the vehicle, the operation amount is an amount of operating the steering member, and the amount of correction is a corrected amount of operating the steering member.

7. The vehicle behavior control system according to claim 6, wherein the controller estimates an excess yaw moment acting on the vehicle, which is caused by a characteristic of a road surface on which a braking operation is applied to the vehicle, and estimates the corrected amount of operating the steering member based on the estimated excess yaw moment.

8. The vehicle behavior control system according to claim 7, wherein the controller determines whether the vehicle is running on the road surface having a characteristic of uneven friction coefficient during the braking operation, and estimates the excess yaw moment based on a target braking force to be applied to each wheel of the vehicle for stable braking operation on the assumption that the road surface has uniform friction coefficient, and estimates a braking force to be applied to each wheel of the vehicle, if it is determined that the braking operation is applied to the vehicle running on the road surface with the uneven friction coefficient.

9. A vehicle behavior control system comprising a controller that (1) obtains a normal vehicle state value based on an operation amount of a vehicle operating member performed by a vehicle operator, (2) obtains an actual vehicle state value, and (3) controls a vehicle behavior based on the actual vehicle state value and the normal vehicle state value, wherein the controller estimates an amount of correction with respect to the vehicle operating member performed by the vehicle operator, and corrects the normal vehicle state value based on the estimated amount of correction.

10. The vehicle behavior control system according to claim 9, wherein the controller estimates the vehicle behavior based on the actual vehicle state value and the normal vehicle state value, obtaining an estimated result, and controls the vehicle behavior based on the estimated result.

11. The vehicle behavior control system according to claim 9, wherein the controller obtains the normal vehicle state value based on the amount of operation with respect to the vehicle operating member performed by the vehicle operator, and controls the vehicle behavior by controlling an actuator of the vehicle in accordance with a control value that brings the vehicle state value into the normal vehicle state value.

12. The vehicle behavior control system according to claim 9, wherein the controller controls the vehicle behavior by controlling a braking force to be applied to each of the wheels.

13. The vehicle behavior control system according to claim 9, wherein the vehicle operating member is a steering member of the vehicle, the operation amount is an amount of operating the steering member, the amount of correction is a corrected amount of operating the steering member, and the normal vehicle state value is a normal yaw rate.

14. The vehicle behavior control system according to claim 13, wherein the controller estimates an excess yaw moment acting on the vehicle, which is caused by a characteristic of a road surface on which a braking operation is applied to the vehicle, and estimates the corrected amount of operating the steering member based on the estimated excess yaw moment.

15. The vehicle behavior control system according to claim 14, wherein the controller determines whether the vehicle is running on the road surface having the characteristic of uneven friction coefficient during the braking operation, and estimates the excess yaw moment based on a target braking force to be applied to each wheel of the vehicle for stable braking operation obtained on the assumption that the road surface has uniform friction coefficient, and estimates a braking force to be applied to each wheel of the vehicle, if it is determined that the braking operation is applied to the vehicle running on the road surface with the uneven friction coefficient.

16. A vehicle behavior control system comprising a controller that (1) obtains a normal vehicle state value based on an operation amount of a vehicle operating member performed by a vehicle operator, (2) obtains an actual vehicle state value, and (3) controls the vehicle behavior by controlling an actuator of a vehicle in accordance with a control value for adjusting the actual vehicle state value into the normal vehicle state value, wherein the controller estimates an amount of correction with respect to the vehicle operating member performed by the vehicle operator, and corrects the control value based on the estimated amount of correction.

17. The vehicle behavior control system according to claim 16, wherein the vehicle operating member is a steering member of the vehicle, the operation amount is an amount of operating the steering member, the amount of correction is a corrected amount of operating the steering member, and the control value is a difference between an actual yaw rate applied to the vehicle and a target yaw rate to be applied to the vehicle.

18. The vehicle behavior control system according claim 17, wherein the controller controls the vehicle behavior by controlling a braking force to be applied to each of the wheels such that the difference between the actual yaw rate applied to the vehicle and the target yaw rate to be applied to the vehicle is reduced.

19. The vehicle behavior control system according to claim 17, wherein the controller estimates an excess yaw moment acting on the vehicle, which is caused by a characteristic of a road surface on which a braking operation is applied to the vehicle, and estimates the corrected amount of operating the steering member based on the estimated excess yaw moment.

20. The vehicle behavior control system according to claim 19, wherein the controller determines whether the vehicle is running on the road surface having the characteristic of uneven friction coefficient during the braking operation, and estimates the excess yaw moment based on a target braking force to be applied to each wheel of the vehicle for stable braking operation obtained on the assumption that the road surface has uniform friction coefficient, and estimates a braking force to be applied to each wheel of the vehicle, if it is determined that the braking operation is applied to the vehicle running on the road surface with the uneven friction coefficient.

* * * * *